(12) United States Patent
Misra et al.

(10) Patent No.: US 9,043,772 B2
(45) Date of Patent: May 26, 2015

(54) OPTIMIZATION HINTS FOR A BUSINESS PROCESS FLOW

(75) Inventors: Rajeev Kumar Misra, Foster City, CA (US); Atul Singh, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1159 days.

(21) Appl. No.: 12/275,994

(22) Filed: Nov. 21, 2008

(65) Prior Publication Data
US 2010/0131937 A1    May 27, 2010

(51) Int. Cl.
*G06F 9/44*    (2006.01)
(52) U.S. Cl.
CPC .................................... *G06F 8/314* (2013.01)
(58) Field of Classification Search
None
See application file for complete search history.

(56) References Cited

U.S. PATENT DOCUMENTS

| | | | |
|---|---|---|---|
| 8,055,586 B1 * | 11/2011 | Sirota et al. | 705/52 |
| 2002/0078432 A1 * | 6/2002 | Charisius et al. | 717/102 |
| 2003/0236782 A1 * | 12/2003 | Wong et al. | 707/5 |
| 2004/0019587 A1 * | 1/2004 | Fuh et al. | 707/2 |
| 2005/0086297 A1 * | 4/2005 | Hinks | 709/203 |
| 2005/0154867 A1 * | 7/2005 | DeWitt et al. | 712/239 |
| 2007/0055557 A1 * | 3/2007 | Kloppmann et al. | 705/7 |
| 2007/0288733 A1 * | 12/2007 | Luick | 712/237 |
| 2008/0040591 A1 * | 2/2008 | Moyer et al. | 712/238 |
| 2008/0052266 A1 * | 2/2008 | Goldstein et al. | 707/2 |
| 2010/0010791 A1 * | 1/2010 | Anerousis et al. | 703/6 |

OTHER PUBLICATIONS

Business Process Management and WS-BPEL 2.0—An Oracle White Paper "What's next for SOA Orchestration?", 10 pages, Oct. 2006.
Optimizer Hints Oracle 9i Database Performance Tuning Guide and Reference, Release 2(9.2), obtained at 39 pages; Nov. 21, 2008.

* cited by examiner

*Primary Examiner* — Li B Zhen
*Assistant Examiner* — Lenin Paulino
(74) *Attorney, Agent, or Firm* — Trellis IP Law Group, PC

(57) ABSTRACT

In one embodiment, an optimization hint may be included in a business process flow. An executable process may be generated from the business process flow where the optimization hint is included in the executable process. While executing the executable process, the runtime engine encounters an optimization hint and determines an optimization to perform. The optimization hint may be related to an aspect of a business process being orchestrated by the business process flow. The optimization is then performed while executing the executable process. For example, the runtime engine may start pre-processing the branch while the condition is being evaluated. If the condition evaluates such that the pre-processed branch should be executed, then the runtime engine has already started processing of that branch. The processing is thus optimized in that the runtime engine is not sitting idle while waiting for the condition to be evaluated.

9 Claims, 5 Drawing Sheets

OPTIMIZATION HINTS FOR A BUSINESS PROCESS FLOW

BACKGROUND

Particular embodiments generally relate to the processing of business process flows.

Business process flows can be modeled by developers, designers, business analysts, or other users to orchestrate a business process. An information technology (IT) developer then codes the business process flow to create an executable process. The executable process may then be executed by a runtime engine. As the executable process is executed, the user may determine that execution is not being performed optimally by the runtime engine. The user may then optimize the business process flow by redesigning it. This requires the executable process to be recoded, which is time consuming and not efficient. Also, the redesigning does not ensure that the executable process will run more efficiently. For example, if a branch is executed only 1% of the time, the flow cannot be redesigned to improve performance.

SUMMARY

Particular embodiments generally relate to using optimization hints in business process flows. In one embodiment, an optimization hint may be included in a business process flow. An executable process may be generated from the business process flow where the optimization hint is included in the executable process. While executing the executable process, the runtime engine encounters an optimization hint and determines an optimization to perform. The optimization hint may be related to an aspect of a business process being orchestrated by the business process flow. For example, a conditional statement may be encountered that may have multiple branches. One of the branches is based on an inventory level of an item being purchased, such as the conditional evaluates whether inventory of the item is greater than 100 units. The optimization hint may indicate that it is most likely that the branch to be selected is the one where the inventory is evaluated to be greater than 100. This may be because in the business process that is modeled, inventory of the item is most likely kept above 100 resulting in that branch being executed most of the time. The optimization hint thus indicates that the branch where inventory is greater than 100 is most likely to be executed. The optimization is then performed while executing the executable process. For example, the runtime engine may start pre-processing the branch while the condition is being evaluated. If the condition evaluates such that the pre-processed branch should be executed, then the runtime engine has already started processing of that branch. The processing is thus optimized in that the runtime engine is not sitting idle while waiting for the condition to be evaluated.

A further understanding of the nature and the advantages of particular embodiments disclosed herein may be realized by reference of the remaining portions of the specification and the attached drawings.

DETAILED DESCRIPTION OF EMBODIMENTS

Figure 1:
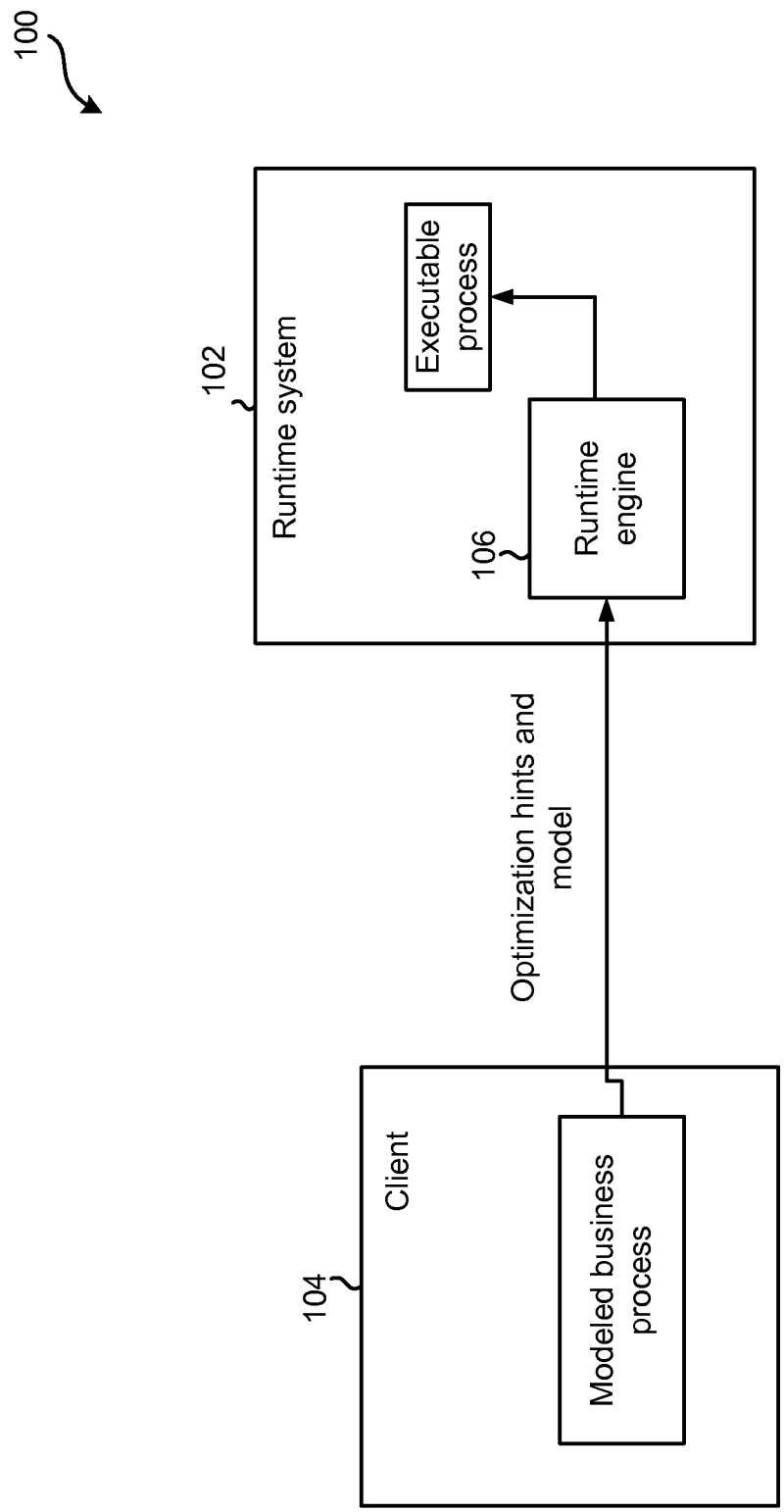
FIG. 1 depicts an example of a system for modeling optimization hints in a business process flow according to one embodiment.

FIG. 1 depicts an example of a system 100 for modeling optimization hints in a business process flow according to one embodiment. System 100 includes a runtime system 102 and a client 104. Although single instances of runtime system 102 and client 104 are provided, it will be understood that multiple instances may be used. Also, runtime system 102 and client 104 may be part of a distributed computing system. That is, functions described may be distributed among various computing devices. Client 104 may be a computing device or set of computing devices that are configured to allow a user (e.g., a developer/designer/business analyst) to model a business process.

The terms business process, business process flow, and executable process will be used in the description of particular embodiments. These terms may be interchangeable. In one example, a business process is the process that the flow is being modeled for. For example, the business process may be the purchase of an item through a web site. To complete the purchase, different steps need to be performed, such as processing an order, scheduling shipping, billing, and any other steps. A business process flow orchestrates the performance of these steps. A user may model the flow of steps using an interface by representing the steps of the flow as elements in a flow diagram. An executable process is then generated for the flow that includes code using a business process software language. A business process software language is a language used to code the executable process based on the business process flow. Examples include business process execution language (BPEL), business process modeling notation (BPMN), and other languages that can model the orchestration of business processes.

Runtime system 102 includes a runtime engine 106 that is configured to execute an executable process for the business process flow. For example, runtime engine 106 orchestrates the invocation of services for the business process flow when executing the executable process. Orchestration may be the coordination and invoking of services that need to be performed in the business process that was modeled. The business process may include services that are performed in a business to fulfill a request, such as an order for an item. For example, the services may be an order process in which a product is ordered, shipped, and billed. Other business processes may be the sale of an item on a website for the business. The orchestration may communicate with external systems to coordinate the performing of the steps.

As discussed above, a business process flow for the business process may be modeled by a user. The user may provide optimization hints in the business process flow that can be used by runtime engine 106 during execution. The optimization hints include information that is used by runtime engine 106 to optimize processing of the executable process. For example, the optimization hints may indicate a branch that more likely may be executed next. In this case, runtime engine 106 can then start processing the branch before it is encountered during execution of the executable process. This may include reading in statements of the code for the branch and performing actions associated with the statements. The pre-processing of the branch may optimize execution if the branch is eventually selected because the statements of the branch may have already been processed and the service or step is ready to be performed without the delay that would occur if the statements of the branch were processed only when the branch was selected.

In one example, the optimization hints may be added to a BPEL flow diagram that is used to model the business process. The BPEL flow diagram represents processing logic in which elements may be added to a flow. The optimization hints may be added as attributes to the elements in the BPEL flow diagram. For example, BPEL activities are elements in which an activity is defined in the flow. The optimization hint may be added to the activity as an attribute. When the executable process is generated, the attributes that are the optimization hints may be incorporated into the executable process.

As discussed above, when the business process flow diagram has been modeled, an executable process may be determined from it. For example, BPEL code that may be executed is generated. The code is processed by runtime engine 106 orchestrate the business process. During run-time, optimization hints are encountered by run-time engine 106 and are used to affect processing of the executable process.

The optimization hints may be based on aspects of the business process being performed. For example, an optimization hint may indicate the most likely event that may occur in the business process. In one example, the optimization hint may be related to the inventory level of an item. In this case, there may be a condition where one branch of code is executed if the item is in stock and another branch of code is executed if the item is not in stock. A user may know how much inventory of the item is in a warehouse and may set the optimization hint according to the inventory. For example, a user may realize that the item is most likely to be stocked in a warehouse and thus may put an optimization hint in the business process flow indicating that the branch that should be performed when an item is in stock is most likely to be executed rather than the branch where the item is out of stock. Thus, while runtime engine 106 is evaluating a condition statement to see whether an item is out of stock, runtime engine 106 may start processing the branch that should be processed if the item is in stock based on the optimization hint. Other optimization hints may be provided based on other factors, such as which branches in the executable process have been more often executed in prior transactions. For example, it may be that after a number of orders, the item has always been evaluated as being in stock and thus the optimization hint should indicate that runtime engine 106 should start executing the branch where the item is in stock while a condition statement is being processed.

Figure 2:
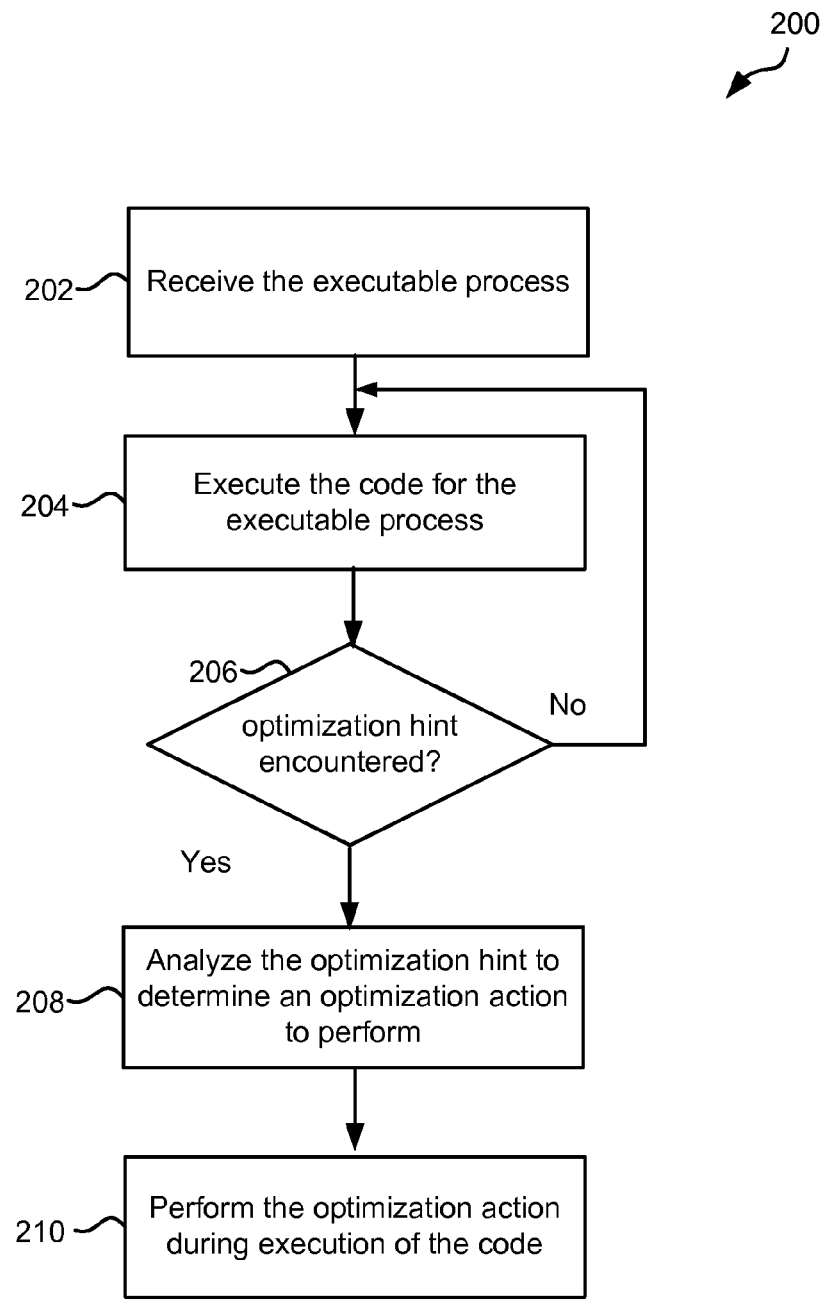
FIG. 2 depicts a simplified flowchart of a method for runtime processing of an executable process according to one embodiment.

FIG. 2 depicts a simplified flowchart 200 of a method for runtime processing of an executable process according to one embodiment. In step 202, runtime engine 106 receives the executable process. The executable process may be generated based on the modeled business process flow. The executable process may include BPEL code that can be executed and also includes optimization hints.

In step 204, runtime engine 106 executes the code for the executable process. During runtime, it is determined if an optimization hint is encountered while executing the code in step 206. If not, runtime engine 106 continues to execute the code. If an optimization hint is encountered, step 208 analyzes the optimization hint to determine an optimization action to perform. For example, the optimization hint may provide information to runtime engine 106 that may guide processing of the executable process. For example, the hint may be used to predict how processing of the executable process may occur in the future.

In step 210, runtime engine 106 performs the optimization action during execution of the code. For example, runtime engine 106 may select a branch of code out of multiple branches that could be executed next and starts pre-processing the selected branch instead of the other branches. If that branch is eventually selected, then runtime engine 106 will have already started processing the branch. Thus, the processing of the executable process is optimized using the optimization hint because instead of waiting and not pre-processing any of the branches, one of the branches is pre-processed. If this branch is eventually selected, the execution is optimized.

Figure 3:
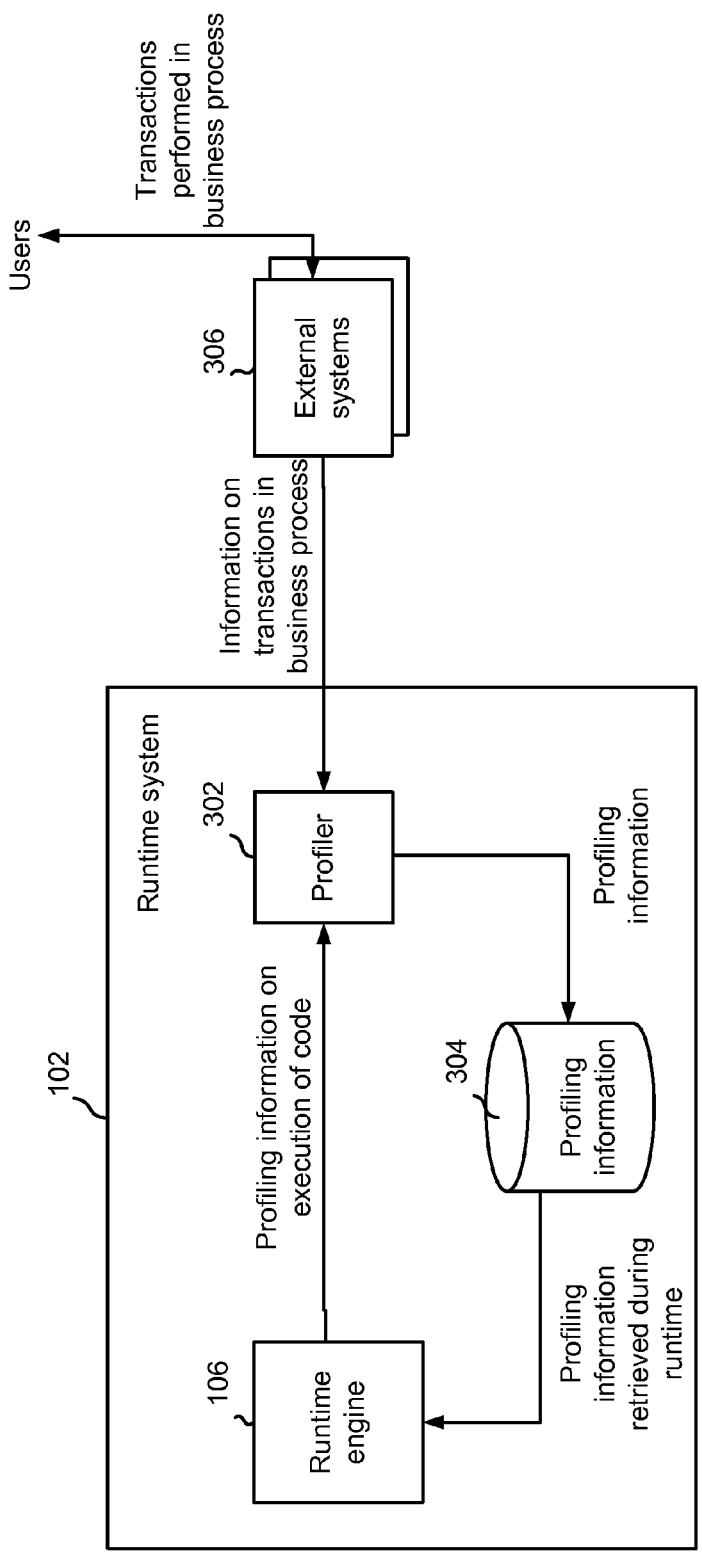
FIG. 3 depicts a more detailed example of the system for determining optimization hints according to one embodiment.

The optimization hints may be integrated into the business process flow in different ways. FIG. 3 depicts a more detailed example of the system for determining optimization hints according to one embodiment. A profiler 302 may be used to determine information that may be used to generate optimization hints. In one example, profiler 302 may determine information about the business process that can be used to determine how optimization hints should be configured in the business process flow or executable process.

In one example, certain acts are being performed in the business process that is being orchestrated. For example, external systems 306 are being used to interact with users that are involved in the business process, such as the user may be purchasing a good or item, having a service performed, etc. The external systems may be systems that are facilitating the purchase, such as a web service that the user is interacting with to purchase the good, a shipping system, invoice system, etc. Also, it will be recognized that external systems 306 may not be interacting with users at all. For example, external systems 306 may be analyzing inventory for a seller and returning the result.

The executable process is used to coordinate the orchestration of the business process. For example, as users go through different steps of the business process, different code of the executable process is executed to orchestrate the process. For example, the first step may be the user orders a product. Then, the business process flow may indicate inventory should be checked to see if the good is in stock. If the good is in stock, the user may be billed in another step. And then, the good may be shipped to the user. The business process flow coordinates these activities by communicating with external systems 306.

Optimization hint profiling information related to the performance of the business process may be determined. Optimization hint profiling information may be determined based on how the transaction is being processed (i.e., a result of the actual order of the good) or how the executable process is being processed (e.g., how many times a branch in the code is executed). For example, it may be determined that the good has been ordered multiple times but is currently out of stock. Also, it may be determined that a seller may already received an order from a user and rejected the order. The performance of the business process ultimately affects how the executable process is processed. For example, if the item is out of stock, then the branch that is executed when the item is out of stock is executed more and this may be determined as the optimization hint profiling information.

The optimization hint profiling information is stored in storage 304. An optimization hint may be configured to use the optimization hint profiling information during execution. For example, if a seller has been rejecting order requests, then the optimization hint profiling information may indicate that orders have been recently rejected. Further, if an item is out of stock, then the optimization hint profiling information may indicate that multiple transactions have been performed and the item is out of stock. Optimization hint profiling information may change dynamically as transactions are performed in the business process. For example, the stock inventory may be changing as items are bought and shipped, and the optimization hint profiling information is changed to indicate the change.

Runtime engine 106 may be configured to read the optimization hint profiling information at runtime. That is, depending on how the business process is being performed in other transactions, runtime engine 106 determines how to process the executable code. In one example, the optimization hint may indicate if the optimization hint profiling information is above a threshold, then a first branch is executed, and if it is below a threshold, then a second branch is executed. This decision is determined at runtime. For example, when the optimization hint is encountered during the processing of executable code, the optimization hint profiling information (e.g., a stock inventory) is returned and used to evaluate the optimization hint.

In another embodiment, the optimization hint may be changed in the executable code based on the optimization hint profiling information. For example, if the optimization hint is used to indicate a branch that is more likely to be evaluated to be true during execution, profiler 302 and/or a user may change the optimization hint to indicate that another branch is most likely to be true. This may involve changing an attribute in the business process flow, which may cause a change to the executable process in that the optimization hint will be changed. However, changing the attribute may not change the flow of the business flow diagram as the same elements are included in the same flow, but an attribute of one of the elements has been changed. For example, if a business process flow is designed and a user sees that it is not being executed optimally, then the user might have to redesign the flow by changing the series of steps that is being executed. However, an optimization hint may be changed in the business process flow instead of changing the design elements in the flow. In this case, the execution at runtime may change but the business process flow stays the same (the series of steps and their order stays the same).

Figure 4:
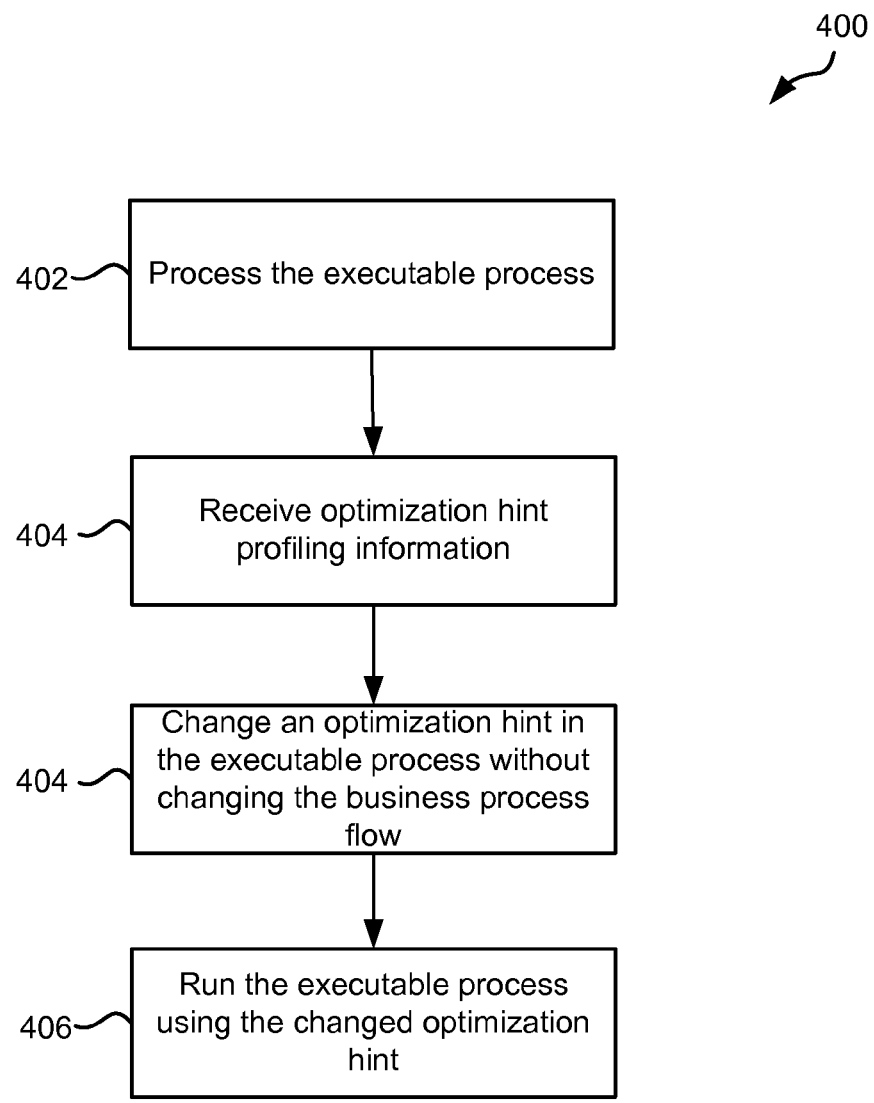
FIG. 4 depicts a simplified flowchart of a method for changing the optimization hint according to one embodiment.

FIG. 4 depicts a simplified flowchart of a method for changing the optimization hint according to one embodiment. Particular embodiments allow the optimization hint to be changed rather than the business process flow.

In step 402, runtime engine 106 processes the executable process. In step 404, optimization hint profiling information is received. Profiler 302 may analyze the business process information to determine if an optimization hint should be changed.

Step 406 changes an optimization hint in the executable process without changing the business process flow. Also, an attribute in the business process flow may be changed for the optimization hint. The attribute may be moved to a different element or the value of it may change. Also, any other methods for changing the optimization hint in the executable process will be appreciated.

Step 408 runs the executable process using the changed optimization hint. The execution is different than if the optimization hint had not been changed; however, the business process flow has not been redesigned or changed. That is, the optimization hint may have been changed in the executable process, but the flow of the business process has not been changed.

Figure 5A:
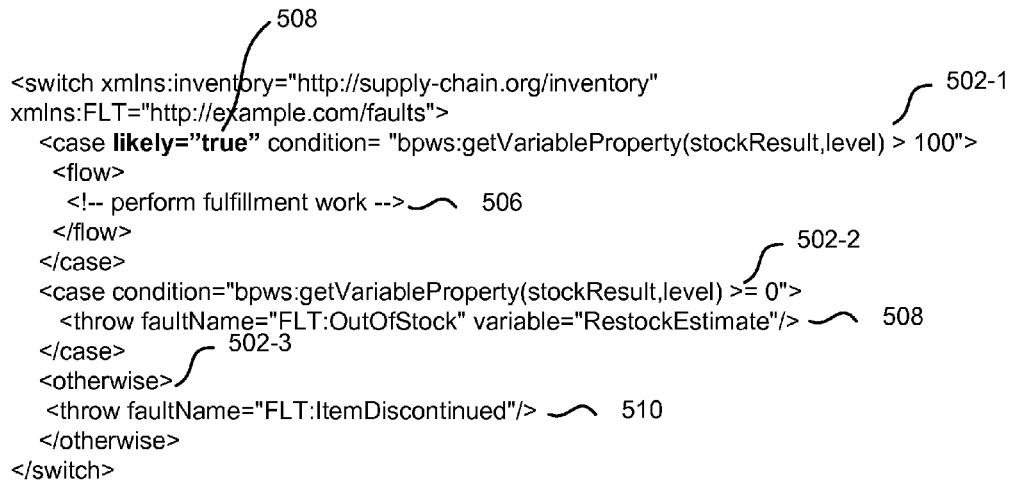
FIG. 5A shows an example of pseudo code for a BPEL switch activity according to one embodiment.

The following provides examples of runtime execution of the executable process according to one embodiment. One example is a switch activity where runtime engine 106 looks at a condition to determine one of multiple statements of the switch activity to execute next. FIG. 5A shows an example of pseudo code for a switch operation according to one embodiment. The code includes two case statements 502-1 and 502-2 and one default (otherwise) statement 502-3. Case statements 502-1 and 502-2 each include a condition to be evaluated. For example, for a case 502-1, a variable that retrieves the stock level for a good is determined and evaluated against a condition to determine if it is greater than 100. Also, a case statement 502-2 evaluates the inventory stock level vs. a level of zero. If neither of these conditions is met, then the otherwise statement 502-3 is performed. Because it takes time to retrieve the information to evaluate the conditions and then compare the information to the conditions, the flow activities in 506, 508, and 510 are not being performed while the condition is being executed conventionally. For example, the condition has to evaluate to true for the actions of perform fulfillment work to be performed at 506. Without using optimization hints, conventionally, runtime engine 306 waits or the condition to be evaluated.

In normal business activity, it might be expected that the inventory stock level is most likely greater than 100. Thus, an optimization hint 508 is added to the executable process. In this case, the optimization hint—likely equal "true"—is added to the condition statement for the first case statement 502-1 of the switch activity. Runtime engine 106 sees the likely equal true for the first case statement 502-1 and then determines that the flow activity 506 should be performed while the evaluation of the condition statement is being determined. If the condition statement turns out to be true, which has been determined to be likely based on the business process, then the execution of the flow activity has already been started and may be completed faster. This adds parallelism in execution and activities may be completed faster rather than waiting for a conditional evaluation to complete and then execution of activity to start.

If the condition does not evaluate to true, then the execution of the first case flow activity 506 is aborted. Condition 502-2 may then be evaluated. Although it is possible this may occur, this may be a rare case due to the profiling information of the business process. Accordingly, the overall process will be optimized even though the execution of the flow activity would not have been performed in a single case.

Figure 5B:
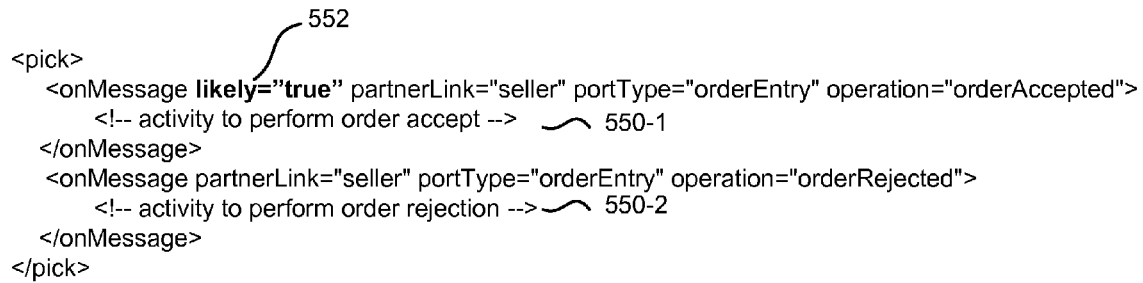
FIG. 5B illustrates a BPEL pick activity according to one embodiment.

FIG. 5B illustrates a BPEL pick activity according to one embodiment. A pick activity is when one of the activities is selected out of a plurality of activities. In this case, activity 550-1 is performed when an order is accepted and then activity 550-2 is performed when an order is rejected. For example, a buyer may have placed an order and is waiting for a seller to accept the order placed. Order acceptance by the seller means the seller has acknowledged they have received the order and they are in process of completion of the order. Different activities are performed depending on whether the order is accepted or rejected.

From optimization hint profiling information, it may be determined if the seller is more likely to accept the order or reject the order. For example, various transactions in the past may have resulted in more orders being accepted than orders being rejected. Also, the optimization hint profiling information may indicate that the seller and the buyer are business partners and the chance of an error in the order placement is low and the order is likely to be accepted. If activity 550-1 is determined to be more likely to happen, then an optimization hint 552 is inserted in that branch. The optimization hint of likely equal "true" indicates that it is more likely that this branch will be executed (i.e., the order will be accepted). Accordingly, the activity shown in 550-1 may be executed by runtime engine 106 while runtime engine 106 waits for the seller to send a confirmation about whether the order was accepted or not.

In another embodiment, the hint may be evaluated using optimization hint profiling information that is retrieved at runtime. For example, the optimization hint may be a variable that retrieves optimization hint profiling information. The information is compared to a threshold to determine which activity should be pre-processed. For example, if the optimization hint profiling information indicates a seller has accepted an order from a buyer before, then the activity that is performed when the order is accepted is pre-processed.

This performance optimization allows activity 550-1 to be processed while runtime engine 106 is waiting for the reply from the seller. When the seller's response arrives, all the activities in activity 550-1 may have been completed. Runtime engine 106 may then complete the transaction and start the next activity. Accordingly, time that may have been spent sitting idle waiting for a response from the seller is used to execute an activity that is determined to be likely performed based on the optimization hint profiling information.

The execution of a business process flow is optimized using the optimization hints. Other optimizations may be if a branch in the executable process is marked as the most likely branch to be performed, then runtime engine 106 keeps BPEL implementation artifacts related to the branch in memory for better performance. For example, the implementation artifacts may be information that is needed in the branch to be processed. Another example is if the optimization hint indicates that the message sent by an entity will only be used to trigger the execution of a particular branch, then runtime engine 106 may start executing the branch because the content of the message is not needed, just the receipt of the message.

Particular embodiments provide optimization of the execution of business process flows. By changing optimization hints, the execution of the flow may change without redesigning the flow of the business process or executable process. That is, the flow of how the elements are connected in the business process flow diagram is not changed; rather, an attribute of one of the elements is changed for the optimization hint. Also, there are situations where redesigning may not be able to improve performance, such as when an exception branch only executes 1% of the time, the process cannot be redesigned to improve performance. Rather, the optimization hint can be used to start performance of the branch that executes 99% of the time. Otherwise, the branch that executes 99% of the time will sit idle until the condition is evaluated to be true.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by one or more processors, for using optimization hint profiling information in a business process flow, the method comprising:

receiving, by the one or more processors, a first optimization hint, where the first optimization hint has a first value based on a condition of a first business aspect of a business process at a first time;

generating, by the one or more processors, executable business process execution language (BPEL) code including the first optimization hint having the first value, with the executable BPEL code determined from a BPEL flow diagram and modeling a first element of the business process and with the executable BPEL code including a path changing operation that determines a path of execution based on the first value of the first optimization hint;

running, by the one or more processors, the executable BPEL code a first time to orchestrate the business process;

receiving, at a second time subsequent to the first time, by the one or more processors, optimization hint profile information relating to a current condition of the first business aspect at the second time;

dynamically changing the first optimization hint in the executable BPEL code to a second value, prior to running the executable process a second time and by the one or more processors, if the optimization hint profile information indicates that the current condition of the first business aspect at the second time has changed from the condition of the first business aspect of the business process at the first time; and running the executable BPEL code a second time, by the one or more processors, and determining the path of execution based on the second value of the first optimization hint, without redesign of the flow of the business process.

2. The method of claim 1 with the second value indicating actual inventory levels or orders for specific goods at the second time.

3. The method of claim 1 where the business process interacts with users purchasing an item or receiving a service.

4. The method of claim 1 where the business process facilitates purchases.

5. Software encoded in one or more non-transitory tangible computer-readable storage media for execution by one or more processors and when executed operable to:
   receive a first optimization hint from a user, where the first optimization hint has a first value based on a condition of a first business aspect of a business process at a first time;
   generate executable business process execution language (BPEL) code including the first optimization hint having the first value, with the executable BPEL code determined from a BPEL flow diagram and modeling a first element of the business process and with the executable BPEL code including a path changing operation that determines a path of execution based on the first value of the first optimization hint;
   running the executable BPEL code a first time to orchestrate the business process;
   receive at a second time subsequent to the first time optimization hint profile information relating to a current condition of the first business aspect as the second time; and
   dynamically change the first optimization hint in the executable code to a second value, prior to running the executable process a second time, if the optimization hint profile information indicates that the current condition of the first business aspect at the second time has changed from the condition of the first business aspect of the business process at the first time;
   run the executable BPEL code a second time and determining the path of execution based on the second value of the first optimization hint, without redesign of the flow of the business process.

6. The software of claim 5 with the second value indicating actual inventory levels or orders for specific goods at the second time.

7. The software of claim 5 where the business process interacts with users purchasing an item or receiving a service.

8. The software of claim 5 where the business process facilitates purchases.

9. An apparatus comprising:
   one or more processors; and
   logic encoded in one or more non-transitory tangible computer-readable storage media for execution by the one or more processors and when executed operable to:
   receive a first optimization hint from a user, where the first optimization hint has a first value based on a condition of a first business aspect of a business process at a first time;
   generate executable business process execution language (BPEL) code including the first optimization hint having the first value, with the executable BPEL code determined from a BPEL flow diagram and modeling a first element of the business process and with the executable BPEL code including a path changing operation that determines a path of execution based on the first value of the first optimization hint;
   running the executable BPEL code a first time to orchestrate the business process;
   receive at a second time subsequent to the first time optimization hint profile information relating to a current condition of the first business aspect as the second time; and
   dynamically change the first optimization hint in the executable code to a second value, prior to running the executable process a second time, if the optimization hint profile information indicates that the current condition of the first business aspect at the second time has changed from the condition of the first business aspect of the business process at the first time;
   run the executable BPEL code a second time and determining the path of execution based on the second value of the first optimization hint, without redesign of the flow of the business process.

* * * * *